May 4, 1926.  
A. A. EWALD  
1,583,224  
SIGNAL ATTACHMENT FOR AUTOMOBILE TAIL LIGHTS  
Filed March 22, 1923     2 Sheets-Sheet 1
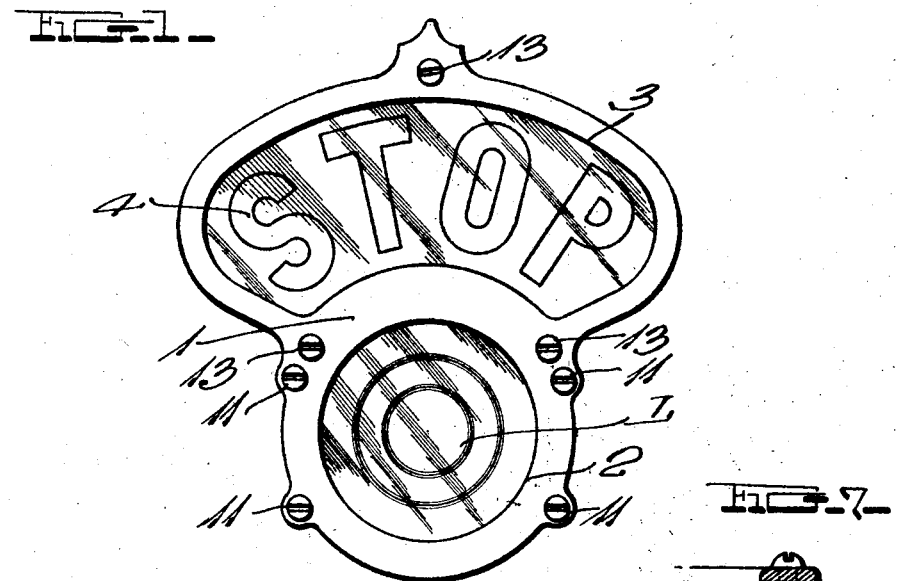
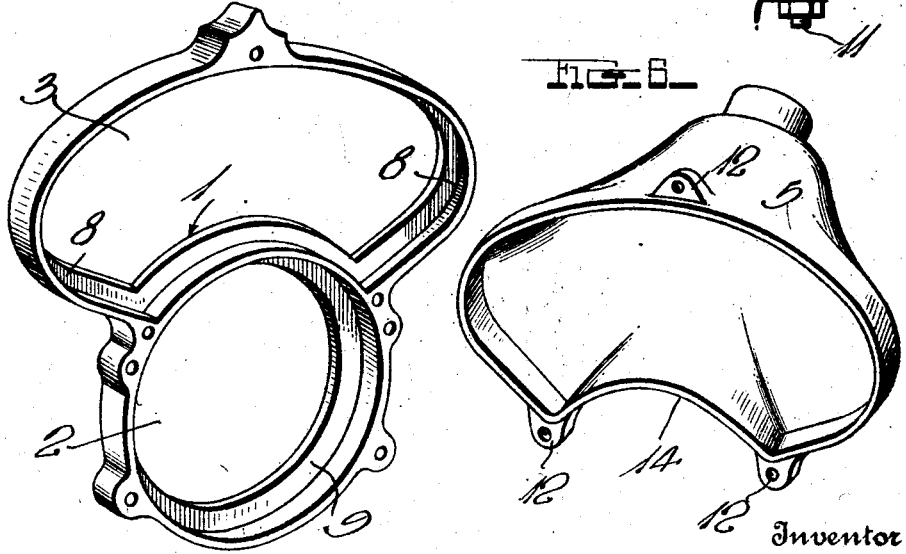
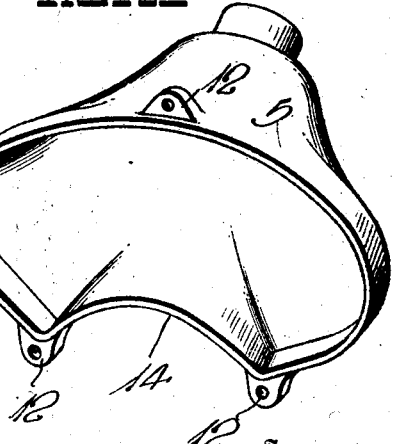
Witness  
H. Woodard
Inventor  
A. A. EWALD  
By H. B. Wilson & Co.  
Attorneys

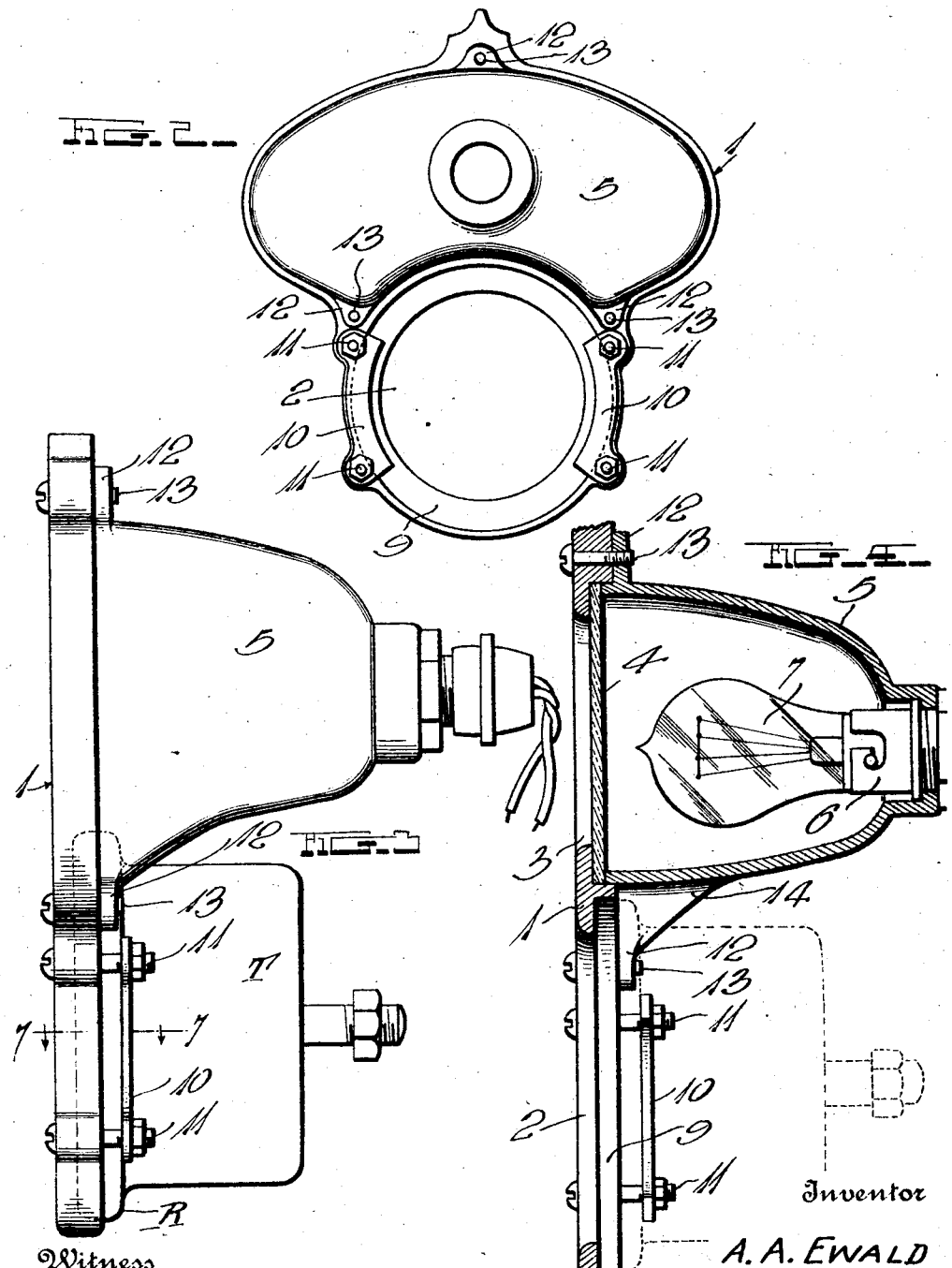

Patented May 4, 1926.

1,583,224

UNITED STATES PATENT OFFICE.

ARNO A. EWALD, OF OAKFIELD, WISCONSIN, ASSIGNOR TO ROMORT MANUFACTURING COMPANY, OF OAKFIELD, WISCONSIN.

SIGNAL ATTACHMENT FOR AUTOMOBILE TAIL LIGHTS.

Application filed March 22, 1923. Serial No. 626,923.

*To all whom it may concern:*

Be it known that I, ARNO A. EWALD, a citizen of the United States, residing at Oakfield, in the county of Fond du Lac and State of Wisconsin, have invented certain new and useful Improvements in Signal Attachments for Automobile Tail Lights; and I do declare the following to be a full, clear, and exact description of the invention, such as will enable others skilled in the art to which it appertains to make and use the same.

My invention relates to improvements in signals for automobiles and the present disclosure is directed to a stop light, although the invention may be made also in the form of a turning signal, if desired.

The principal object of the invention is to provide a simple attachment for the ordinary universally used automobile tail light, said attachment carrying a signal such as a stop light and being so constructed as to give the appearance that the tail light and signal light form a single article of manufacture.

Another object is to provide an attachment which will present an attractive appearance, even though the tail light may be rather unsightly due to rust, bending, etc.

A still further object is to provide novel attaching means for the device engageable with the usual lens encircling rim of the tail light casing.

With the foregoing in view, the invention resides in the novel subject matter hereinafter described and claimed, the description being supplemented by the accompanying drawings.

Figure 1 is a face view of the invention attached to a tail light.

Figure 2 is an elevation of the reverse side of the attachment separate from the tail light.

Figures 3 and 4 are respectively a side elevation and a vertical sectional view showing the manner of connecting the attachment to the tail light.

Figure 5 is a perspective view looking toward the reverse side of the face plate.

Figure 6 is a perspective view of the signal light casing.

Figure 7 is a detail horizontal sectional view as indicated by line 7—7 of Fig. 3.

In the drawings above briefly described, the numeral 1 designates a suitably designed face plate having a lower opening 2 which is preferably of circular form, and an upper opening 3 which in most instances is arcuate and concentric with the opening 2. Means are provided for securing the plate 1 against the rear end of an ordinary tail light T of the cylindrical form universally used on automobiles, the positioning of the plate being such that the lens L of the tail light will be exposed in the opening 2. A signalling plate 4 closes the opening 3 and is preferably formed of red glass, engraved, painted, or otherwise treated to disclose a signalling legend such as the word "Stop." A signal light casing 5 is carried by the plate 1 and is provided with a suitable socket 6 to receive an electric light bulb 7. By suitable switch means, forming no part of the present invention, the bulb 7 may be illuminated to distinctively display the legend on the plate 4 whenever desired.

The reverse side of the plate 1 is preferably recessed as indicated at 8 around the opening 3 to form a seat for the signalling plate 4 and the open front end of the light casing 5 preferably extends into this recess as shown in Fig. 4, for the purpose of clamping said plate in place, suitable cushions (not shown) being employed to yieldably hold said plate if desired.

Another recess 9 is preferably formed in the reverse side of the plate 1, around the opening 2, for the purpose of receiving the usual lens-encircling rim R of the tail light casing, thus insuring proper relative positioning of the plate 1 and the tail light. While any desired means may be employed for securing said plate and tail light in proper relation, I prefer to employ a pair of arcuate clamping plates 10 to engage the rim R in the manner shown in Figs. 3 and 7, bolts or other screw-threaded fasteners 11 being passed through the plate 1 and the clamping plates 10 to draw them toward each other and thus frictionally hold said plate 1 in proper position.

It will be understood that the light casing 5 may be of any desired configuration and secured in place in any preferred manner. For sake of appearance however, it is preferably of the formation shown and in most instances, I prefer to provide said casing with outstanding ears 12 with which screws or the like 13 co-act, for the purpose of detachably securing the casing to the plate 1. In the formation shown, the lower side of this casing is arched to some extent as indicated at 14, to extend over the tail light T, but this contour is not in all instances essential.

By providing a device of the construction shown or constructed in a similar manner, it may be easily attached to an ordinary tail light and even though the latter may be rather unsightly, the attachment will give the appearance that both the tail light and the signal constitute a single attractive article of manufacture. The device has been successfully constructed and used and has been found to present a very unique appearance which cannot without rather close scrutiny, be distinguished from the combined tail and signal lights heretofore devised.

On account of the proven advantages of the construction disclosed, this construction may be followed if desired, but it is to be understood that the present illustration merely discloses one of the many ways of carrying my invention into use and that within the scope of the invention as claimed, numerous minor changes may be made.

I claim:

1. In an automobile signalling device, the combination with the usual cylindrical tail light casing having the common red lens, and the usual outwardly stamped rim in which the edge of said lens is secured; of a plate contacting with the rear side of said rim and extending laterally from said casing, said plate having an opening through which said red lens is visible and another opening beyond the casing, clamping members engaging the front side of said rim, means for moving said members with respect to the plate to secure said plate to the casing, a conspicuous signalling lens for said other opening, a signal casing adapted to contain a light for said signalling lens, and means securing said casing to said plate at one side of the tail light casing.

2. An article of manufacture for attachment to an ordinary tail light casing having the usual outstanding lens-encircling rim, said article comprising a signal having a carrying plate for contact with the rear side of said rim, said plate having an opening to expose the usual red tail light lens, and clamping means carried by said plate to engage the front side of said rim and secure the plate in place.

3. The combination with a tail lamp having the usual lens and holding means therefor, of a face plate having an opening with a signal lens in said opening and a second opening for exposing the tail lamp lens, a casing having an open end, lamp-holding means in said casing, means for securing said casing with its open end at said signal lens and opening and means for securing said plate to said tail lamp with the said second opening over the tail lamp lens, the outer face of the plate being in substantially a vertical plane throughout its area, giving the appearance that the tail lamp and the associated parts all form a single article of manufacture.

In testimony whereof I have hereunto affixed my signature.

ARNO A. EWALD.